(12) United States Patent
Neipris et al.

(10) Patent No.: US 11,457,081 B2
(45) Date of Patent: Sep. 27, 2022

(54) NETWORK RESOURCES DISCOVERY SYSTEM

(71) Applicant: Expectations Squared, Inc., Foxboro, MA (US)

(72) Inventors: Edward Neipris, Wrentham, MA (US); Daniel Jack Gaido, Tuscaloosa, AL (US)

(73) Assignee: EXPECTATIONS SQUARED, INC., Foxboro, MA (US)

( * ) Notice: Subject to any disclaimer, the term of this patent is extended or adjusted under 35 U.S.C. 154(b) by 76 days.

(21) Appl. No.: 16/369,466

(22) Filed: Mar. 29, 2019

(65) Prior Publication Data

US 2019/0306253 A1    Oct. 3, 2019

Related U.S. Application Data

(60) Provisional application No. 62/650,336, filed on Mar. 30, 2018.

(51) Int. Cl.

| | |
|---|---|
| G06F 15/173 | (2006.01) |
| H04L 67/51 | (2022.01) |
| H04L 9/40 | (2022.01) |
| H04L 41/12 | (2022.01) |
| H04L 67/1061 | (2022.01) |

(52) U.S. Cl.
CPC .............. *H04L 67/51* (2022.05); *H04L 41/12* (2013.01); *H04L 63/0263* (2013.01); *H04L 67/1061* (2013.01)

(58) Field of Classification Search
CPC ..... H04L 67/16; H04L 63/0263; H04L 41/12; H04L 67/1061; H04L 63/0281; H04L 67/1063; H04L 67/107; H04L 67/51

USPC .......................................................... 709/223
See application file for complete search history.

(56) References Cited

U.S. PATENT DOCUMENTS

| | | | |
|---|---|---|---|
| 2006/0239190 A1* | 10/2006 | Kumar ................ | H04L 67/1068 370/230 |
| 2014/0280461 A1* | 9/2014 | Gast ........................ | H04L 67/16 709/202 |
| 2014/0337526 A1* | 11/2014 | Amishav ................ | H04L 67/16 709/225 |

(Continued)

*Primary Examiner* — Alan S Chou
(74) *Attorney, Agent, or Firm* — Kriegsman & Kriegsman

(57) ABSTRACT

A network resources discovery system regulates the automated discovery of available network resources using a network-enabled device to ensure that the network-enabled device only discovers the specific network resources which it is authorized to access. In use, a network resources discovery proxy includes a local controller which intermediates network resources discovery request and response packets transmitted between the network-enabled device and available network resources. By comparing the network resources discovery packets against a local, modifiable set of matching rules, the network resources discovery proxy is able to filter out the automated discovery of any types of services and devices provided by a computer network which the network-enabled device is not permitted to receive. By restricting the automated discovery of network resources in accordance with the local set of matching rules, the network resources discovery system provides an enhanced level of network security through the selective isolation of network devices.

12 Claims, 3 Drawing Sheets

(56) References Cited

U.S. PATENT DOCUMENTS

| | | | |
|---|---|---|---|
| 2014/0359148 A1* | 12/2014 | Cherian | H04W 48/16 709/229 |
| 2017/0111476 A1* | 4/2017 | Saheba | H04L 67/42 |
| 2017/0150337 A1* | 5/2017 | Bareket | H04L 67/104 |
| 2019/0104398 A1* | 4/2019 | Owen | H04L 41/22 |

* cited by examiner

NETWORK RESOURCES DISCOVERY SYSTEM

CROSS-REFERENCE TO RELATED APPLICATIONS

The present application claims the benefit under 35 U.S.C. 119(e) of U.S. Provisional Patent Application No. 62/650,336, which was filed on Mar. 30, 2018 in the names of Edward Neipris et al., the disclosure of which is incorporated herein by reference.

FIELD OF THE INVENTION

The present invention relates generally to computer networks and, more particularly, to the automated discovery of available network resources using a network-enabled device.

BACKGROUND OF THE INVENTION

A computer network is often designed with a variety of different subnetworks, or subnets, which are physically interconnected but logically separate. For instance, in the hospitality industry, a property is commonly configured with an expansive computer network that includes a multitude of different subnets, one or more of which is designed to support a designated network resource, such as a network device and/or service. For example, a computer network for a hotel property is often configured with subnets that provide, inter alia, internet services, content streaming services, print services, videotelephony services, gaming services, and home automation services (e.g. smart lighting and thermostat systems).

In FIG. 1, there is shown a simplified schematic representation of a conventional network system 11. In network system 11, a network-enabled compute device 13, represented herein as a smartphone, is able to wirelessly connect to a local area network 15 at a particular location, such as a hotel or other similar establishment. In the present example, network 15 is shown comprising a pair of logically independent subnets 17-1 and 17-2.

In illustrative network system 11, subnet 17-1 is represented as providing content streaming services. More specifically, subnet 17-1 provides screencasting services through a plurality cast receiving, or casting, devices 19-1 thru 19-3 which are independently connected to the internet via local router 21-1. Casting devices 19-1 thru 19-3 are, in turn, electrically connected to corresponding monitors 23-1 thru 23-3, respectively (e.g. by being physically plugged into a designated HDMI port). In use, network-enabled device 13 is able to initiate the delivery of streaming digital content from a designated source (e.g. a streaming content media provider) to a particular casting device 19. In this manner, the desired streaming content can be displayed on enlarged monitor 23 for an enhanced viewing experience. An example of a casting device of the type described above is the Chromecast® streaming media player, which is manufactured and sold by Google, LLC.

In a similar fashion, subnet 17-2 is represented herein as providing print services. More specifically, subnet 17-2 provides print services through a plurality of network printers 25-1 thru 25-3 which are independently connected to network 15 via local router 21-2. In use, network-enabled device 13 is able to transmit a print job to a selected network printer 25 in subnet 17-2.

Designing network 13 with multiple, logically disparate subnets 17 promotes scalability (e.g. to support an increasing need of network services). Additionally, separating network services into independently operating subnets 17 enhances security, as a user is only able to discover and utilize the network resources supported by a subnet 17 to which connection has been established. In other words, if device 13 is unable to connect to a particular subnet 17, the resources provided by that subnet 17 remain hidden to device 13 and therefore inaccessible for use.

In order to access the network resources afforded by each subnet 17, device 13 first engages in an automated discovery process to locate each subnetwork 17 and all of its supported resources, including any computing devices and/or Internet of things, or IoT, devices. As part of the traditional network resources discovery process in a hospitality setting, the user first connects network-enabled device 13 to local network 15 through a standard web-based or software application portal.

Once connected to local network 15, device 13 sends non-routing, network resources discovery request packets, represented generally by reference numeral 27, directly to each subnet 17. A network resources response packet, represented generally by reference 29, is sent in return from each subnet 17 that satisfies the network resources discovery request. In response packet 29, information is typically provided which may include, among other things, details for connecting to subnet 17 as well as the types of available services and/or identification of network devices contained within that subnet 17. In this manner, a data path can be established with one or more selected components within the connected subnet 17 using network-enabled device 13.

Although well-known in the art, the system architecture and network resources discovery process set forth in detail above have been found to suffer from a couple notable shortcomings.

As a first shortcoming, in prior art system 11, network resources discovery packets 27 are sent directly from device 13 to subnets 17. Due to the non-routing nature of network resources discovery packets 27, device 13 is only able to connect to those local subnets 17 which receive the addressed request packet 27. In other words, a router 21 within a particular subnet 17 does not forward the discovery request to related subnets 17 in order to expand the scope of resources available to the user.

As a second shortcoming, in prior art system 11, connection established between device 13 and a particular subnet 17 renders all resources related to that subnet (including the various components residing within that subnet) discoverable by the user. Once discovered, the user may unintentionally or maliciously transmit data to a component within subnetwork 17 that should otherwise be inaccessible.

For example, once connection is established between network-enabled device 13 and subnetwork 17-1, all casting devices 19 within subnet 17-1 are automatically discovered by device 13. As such, a user may unintentionally or maliciously initiate the delivery of potentially sensitive streaming media content to a casting device 19 located in a neighboring room of the user. In other words, system 11 is currently incapable of isolating, or restricting, the discovery of components and/or services within a connected subnetwork to an authorized set of users. As a result, it has been found that the network resources discovery process associated with prior art system 11 creates a significant privacy issue, particularly in environments in which multiple, unrelated individuals frequently access a common subnetwork with components designated for use by a limited subset of those individuals, such as hotels, apartment buildings, shared workspaces, schools, hospitals and the like.

SUMMARY OF THE INVENTION

It is an object of the present invention to provide a new and improved system for automating the discovery of available network resources using a network-enabled device.

It is another object of the present invention to provide a network resources discovery system of the type as described above which is easily configurable and readily scalable.

It is yet another object of the present invention to provide a network resources discovery system of the type as described above which is designed to support a wide scope of network services.

It is still another object of the present invention to provide a network resources discovery system of the type as described above which is able to restrict the discovery of certain resources within a computer network to an authorized set of user devices.

Accordingly, as one feature of the present invention, there is provided a system for facilitating the automated discovery of network resources provided by a computer network using a network-enabled device, the system comprising (a) a computer network configured to support a network resource, and (b) a network resources discovery proxy configured with a set of network resources matching rules, (c) wherein the network resources discovery proxy intermediates network resources discovery packets sent between the network-enabled device and the computer network.

As another feature of the present invention, there is provided a method for automatically discovering network resources provided by a computer network using a network-enabled device, the method comprising the steps of (a) providing a network resources discovery proxy for intermediating network resources discovery packets sent between the network-enabled device and the computer network, (b) storing a set of network resources matching rules in the network resources discovery proxy, and (c) sending network resources discovery packets between the network-enabled device and the computer network in compliance with the set of network resources matching rules.

Various other features and advantages will appear from the description to follow. In the description, reference is made to the accompanying drawings which form a part thereof, and in which is shown by way of illustration, an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings, wherein like reference numerals represent like parts.

DETAILED DESCRIPTION OF THE INVENTION

Network Resources Discovery System 111

Figure 1:
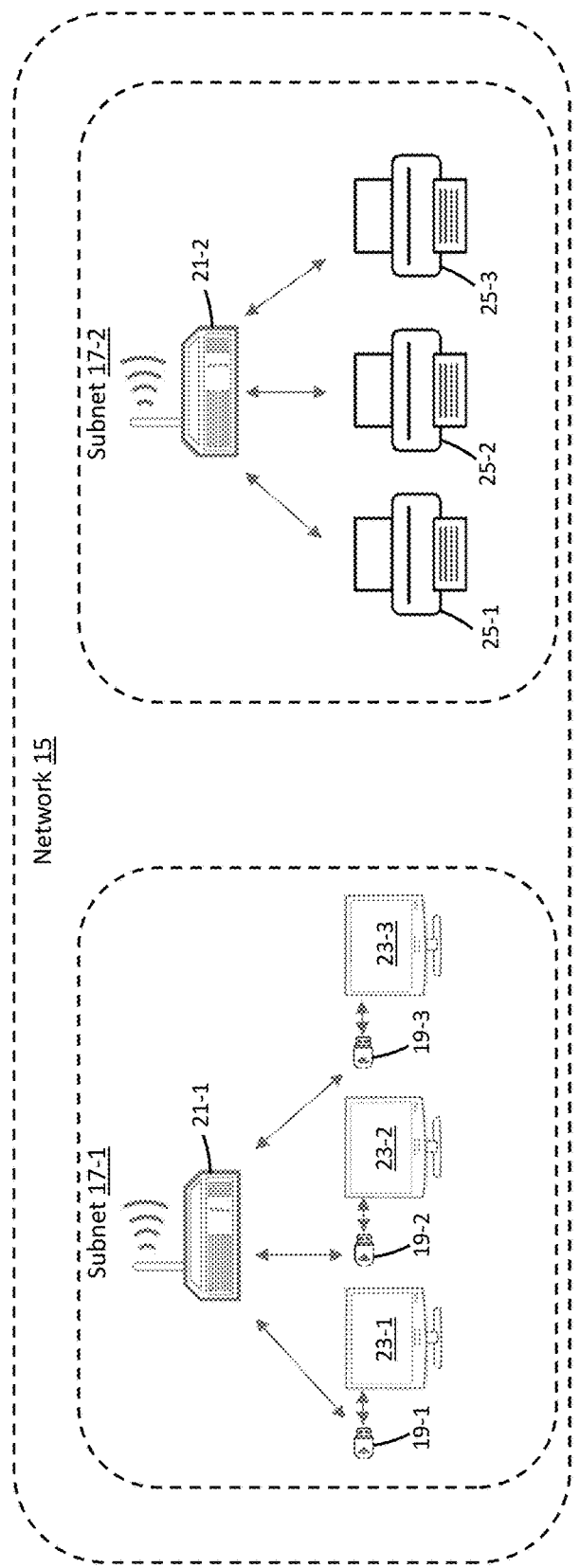
FIG. 1 is a simplified schematic representation of a network system which is well known in the art.
Figure 1:
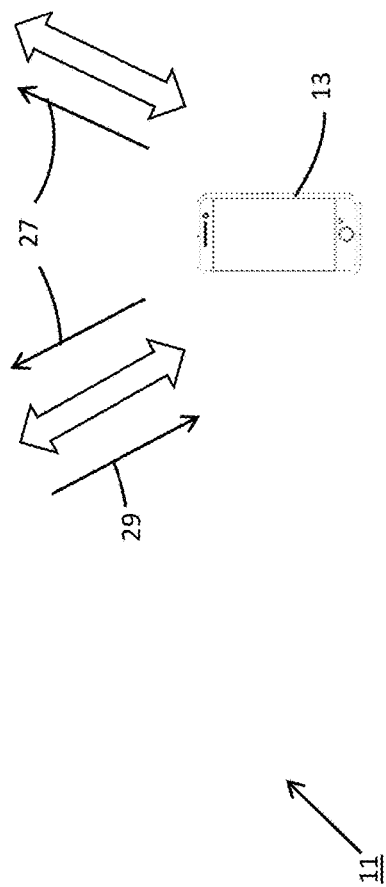
Figure 2:
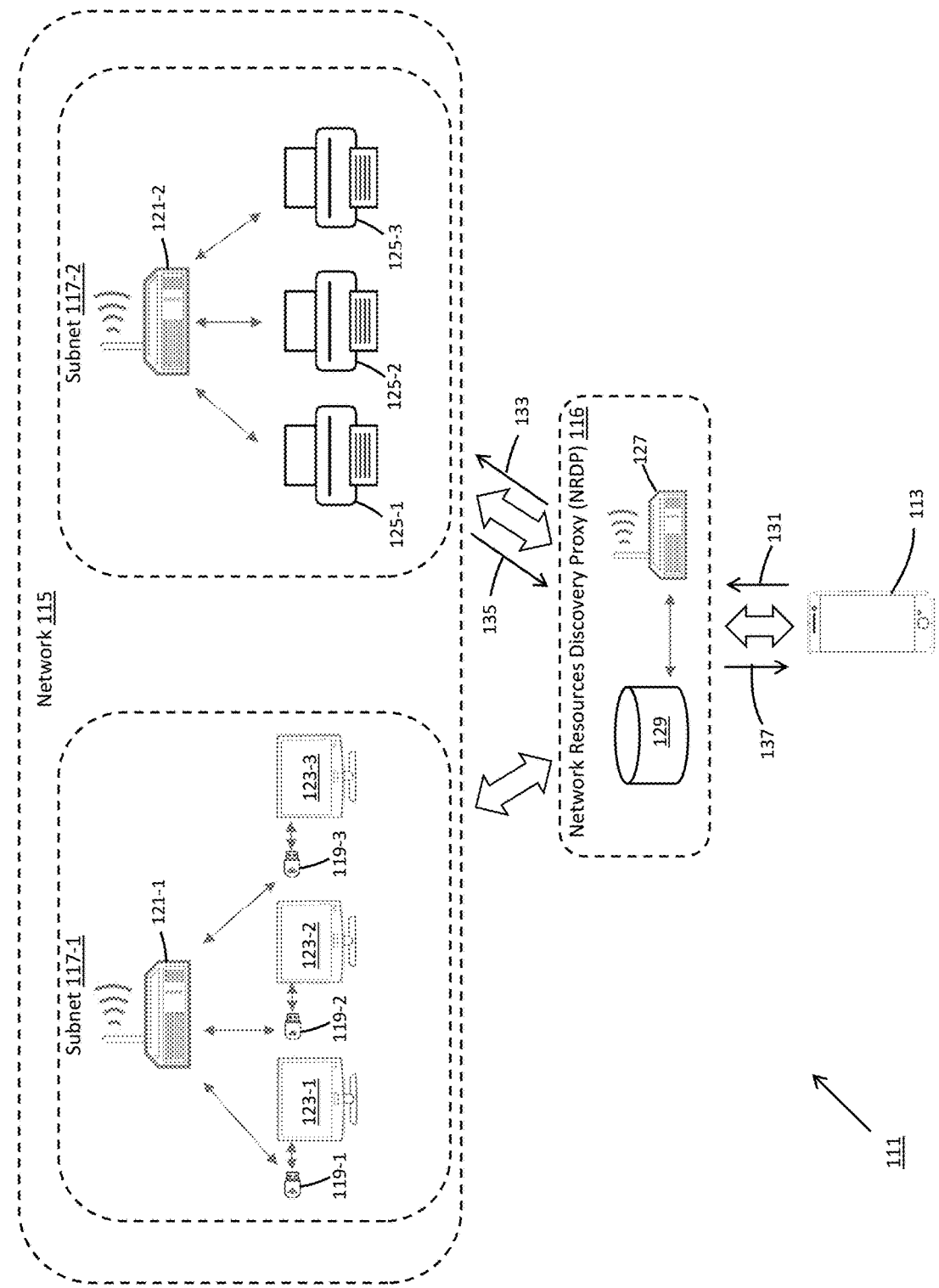
FIG. 2 is a simplified schematic representation of a novel network resources discovery system constructed according to the teachings of the present invention.

Referring now to FIG. 2, there is shown a simplified schematic representation of a system for automating the discovery of available network resources using a network-enabled device, the network resources discovery system being constructed according to the teachings of the present invention and identified generally by reference numeral 111. As will be explained in detail below, network resources discovery system 111 is uniquely designed to oversee and selectively filter the automated network resources discovery process in order to restrict a network-enabled device to discover only those network services and/or devices that it is previously authorized to access, thereby enhancing the overall security of system 111, which is a principal object of the present invention.

As defined herein, use of the term "network resources" encompasses both the specific physical devices contained within a particular network (e.g., network printers, casting devices and the like) as well as the various services provided, at least in part, by such network devices (e.g. file sharing services, content streaming services and the like).

In the description that follows, system 111 is described principally for use in a hospitality-based environment, such as hotel or other similar property. However, it should be noted that specific applications for system 111 referenced below are provided for illustrative purposes only. As such, it is envisioned that system 111 could be readily integrated into a wide variety of potential applications without departing from the spirit of the present invention.

As shown herein, system 111 is similar to system 11 in that system 111 comprises a network-enabled device 113, such as a smartphone, which is adapted to wirelessly connect to a local area network 115. System 111 differs from system 11 in that system 111 additionally includes a network resources discovery proxy (NRDP) 116 which acts as an intermediary for network resources discovery requests and responses sent between network-enabled device 113 and the various subnets within local network 115, as will be explained further in detail below.

Similar to network 15, local network 115 is represented as comprising a pair of logically independent subnetworks, or subnets, 117-1 and 117-2. In the present embodiment, network 115 is shown comprising only two subnets 117 for ease of illustration and understanding. However, it is to be understood that network 115 would be ideally configured with a substantially greater number of subnetworks 117 to expand the scope of services available to the user.

Each subnet 117 represents any type of computer network. Preferably, each subnet 117 is specifically designed with the necessary equipment to support a designated network service, such as, but not limited to, internet services, content streaming services, print services, videotelephony services, gaming services, home automation services and the like.

For example, in illustrative network system 111, subnet 117-1 is represented as providing content streaming services. More specifically, subnet 117-1 provides screencasting services through a plurality cast receiving, or casting, devices 119-1 thru 119-3 which are independently connected to the internet via local router 121-1. Casting devices 119-1 thru 119-3 are, in turn, electrically connected to corresponding monitors 123-1 thru 123-3, respectively (e.g. by being physically plugged into a designated HDMI port).

In a similar fashion, subnet 117-2 is represented herein as providing print services. More specifically, subnet 117-2 provides print services through a plurality of network printers 125-1 thru 125-3 which are independently connected to network 115 via local router 121-2. If properly authorized, network-enabled device 113 is designed to send a print job to a selected network printer 125 within subnet 117-2.

As referenced briefly above, network resources discovery proxy 116 acts as an intermediary for network resources discovery requests and responses sent between network-enabled device 113 and the various subnets 117 within local network 115. In this manner, proxy 116 can not only expand the scope of network services available to device 113 (i.e. through the elimination of non-routing network resources discovery request packets) but also engage in active filtering of network resources discovery response packets in order to ensure that device 113 only discovers the specific services and/or devices of a subnet 117 which it is authorized to access. In this capacity, the inclusion of network resources discovery proxy 116 serves to enhance the overall security of network system 111, which is a principal object of the present invention.

As can be seen, network resources discovery proxy 116 preferably comprises a local controller, or processor, 127 in electrical communication with a local or cloud-based database 129. Although not shown herein, it is envisioned that controller 127 and database 129 could be alternatively configured as a unitary hardware device without departing from the spirit of the present invention.

As will be explained in detail below, controller 127 regulates the transmission of discovery packets between network-enabled device 113 and the various subnets 117 in compliance with network resources matching, or pairing, rules stored in database 129. In this manner, controller 127 is configured to restrict network resources discovery to the specific services and/or devices of a particular subnet 117 which user device 113 is authorized to access, which is a principal object of the present invention.

For simplicity, controller 127 is represented herein as a local router that is uniquely programmed to proxy and filter the automated network resources discovery process between network-enabled device 113 and subnets 117. However, it is to be understood that controller 127 is not limited to any particular type of hardware, but rather, represents any programmable device that can be situated inside the firewall for network 115, with one controller 127 sufficient for the resource discovery proxying and filtering requirements of network 115.

Network Resources Discovery Process 211

Figure 3:
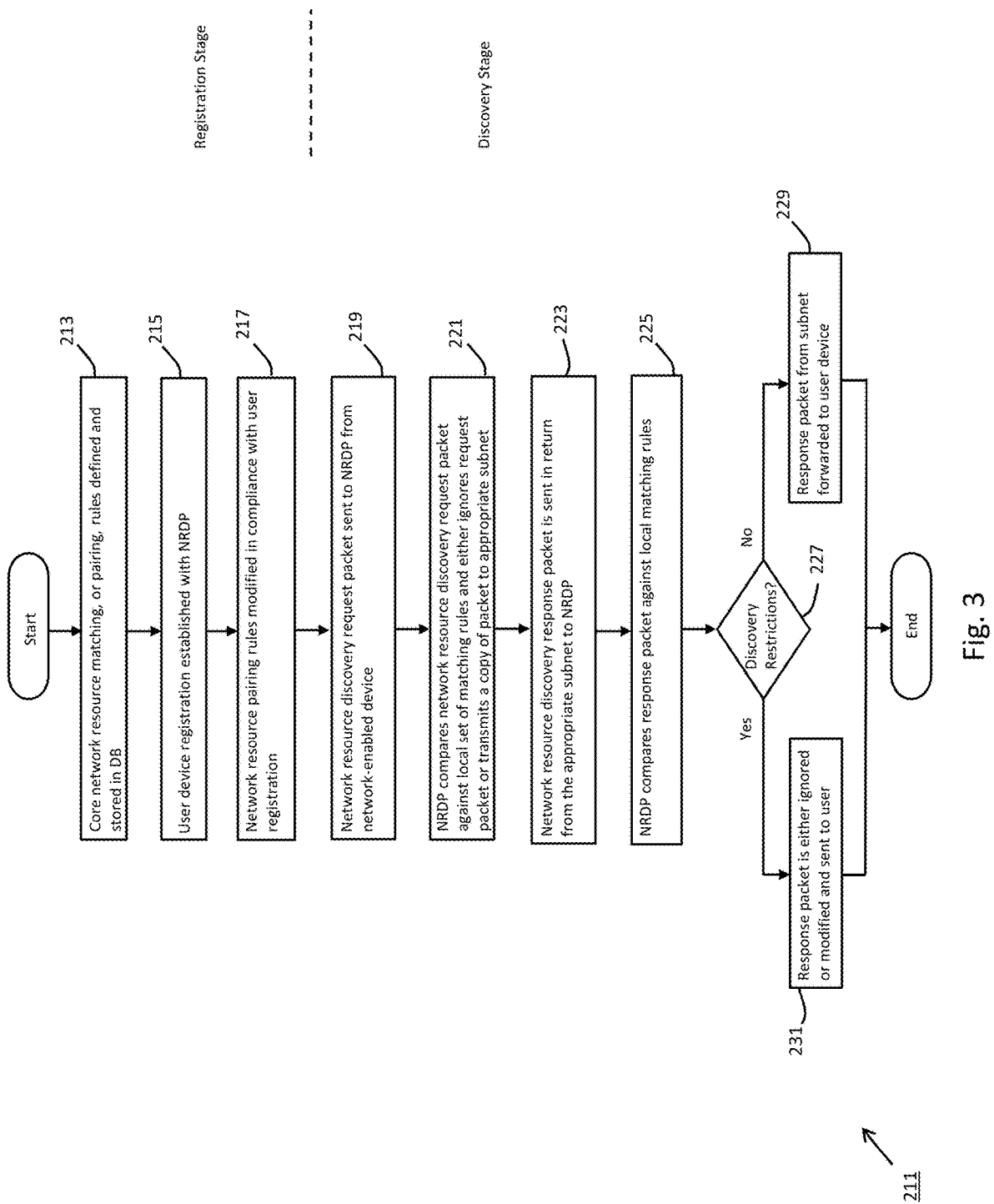
FIG. 3 is a flow chart representing a novel network resources discovery process which can be implemented using the architecture of the network resources discovery system shown in FIG. 2.

As referenced above, network resources discovery system 111 is uniquely designed to restrict automated resource discovery to the specific services and/or devices of a particular subnet 117 which user device 113 is authorized to access. Referring now to FIG. 3, the specific process by which system 111 restricts the automated discovery of network resources is set forth in detail, the network resources discovery process being identified generally by reference numeral 211.

As will be explained further below, network resources discovery process 211 relies upon two principal stages: (i) a registration stage in which network resources matching rules are defined that establish the scope of automated resource discovery of subnetworks 117 by user device 113, and (ii) a discovery stage in which user device 113 automatically discovers a selection of the network resources provided by subnetworks 117 in compliance with the previously-established network resources matching rules.

Specifically, as a primary step 213 in the registration phase, a core set of local network resources matching, or pairing, rules are defined and stored in database 129. The core set of local network resources matching rules may include, inter alia, (i) a grouping, or linking, of a designated set of IoT devices (e.g. set of various IoT devices located in a common hotel room) or (ii) more general authorization rules, such as rendering the network resources provided by a particular subnet 117 fully discoverable to any network-enabled device 113 in communication with local network 115.

Thereafter, as part of step 215, each user device 113 is individually registered with network resources discovery proxy 116. Through this registration process, information about user device 113 is collected which is, in turn, utilized to define the scope of discoverable network resources provided by subnetworks 117.

For example, in a hotel setting, registration step 215 may require user device 113 to electronically associate user device 113 with a particular room or suite. In this scenario, it is envisioned that step 215 could be achieved through a variety of different mechanisms including, but not limited to, using device 113 to scan a QR code located in the room. In turn, device 113 is electronically linked with NRDP 116 and a registration screen is provided on device 113 which may confirm the room pairing and/or request additional information (e.g. payment information, if required for access to certain network services).

It is important to note that, as part of registration step 215, no sensitive personal information is required. As such, it is to be understood that network resources discovery process 211 is fully compliant with existing data protection regulations.

Upon completion of registration step 215, the pairing information (e.g. associating user device 113 with a particular hotel suite) is transmitted to database 129. Then, as part of step 217, the local network resources matching rules stored in database 129 are modified in accordance with the device registration information, thereby completing the registration stage and advancing method 211 to the discovery stage.

For simplicity purposes only, registration stage is represented herein as a one-time process. However, it is to be understood that ideally the registration stage is routinely repeated based on the needs of the intended application. As such, the local matching rules can be modified, as needed, to continuously support additional devices 113. For example, in a hotel setting, the aforementioned registration stage would be repeated each time a new network-enabled device 113 requests access to local network 115.

Having completed the registration stage, network-enabled device 113 initiates the discovery stage by transmitting a network resources discovery request packet using standards-based protocol as part of step 219, the network resources discovery request packet being represented generally by reference numeral 131 in FIG. 2.

Upon receiving the network resources discovery request packet from device 113, local controller 127 then compares the network resources discovery request packet against the local set of matching rules stored in database 129 to determine how to manage the request packet, as represented in step 221. In particular, as part of step 221, network resources discovery proxy 116 either (i) ignores the request packet (e.g. if the user is not authorized to access the resources afforded by the requisite subnets 117 of network 115) or (ii) transmits a copy of the network resources discovery request packet to the one or more subnets 117 which are considered appropriate for handling the request.

For example, in system 111, if network resources discovery is required by device 113 in connection with a print request and user device 113 is unauthorized to connect to any of the resources provided by subnet 117-2, controller 127 ignores the request. However, if device 113 is authorized to access certain resources afforded by subnet 117-2, a copy of the network resources discovery request packet is sent to subnet 117-2, as represented by reference numeral 133 in FIG. 2.

In step 223 of process 211, a network resources discovery response packet is sent in return from each subnet 117 that received the previous request packet, the response packet being represented generally by reference numeral 135 in FIG. 2. As previously noted, a subnet response packet typically includes information relating to the subnet 117 comprising, but not limited to, details for connecting to the subnet 117 (e.g. if payment is required), services offered by the subnet 117 and/or network components contained within the subnet 117.

Thereafter, in step 225, controller 127 compares the information in each response packet against the local set of matching rules stored in database 129. Notably, as set forth in step 227, controller 127 determines whether to impose any network resources discovery restrictions to the response packet based on the local set of matching rules.

If no network resources discovery restrictions exist for the user device 113 within the designated subnet 117, controller 127 forwards the response packet, as is, to device 113, as represented in step 229. Therefore, once properly connected to subnet 117 (e.g. upon paying any requisite access fees), all services and devices offered by the connected subnet 117 are automatically discoverable by device 113.

However, if matching rules impose certain network resources discovery restrictions, controller 127 filters the response packet in compliance with the local matching rules, as represented in step 231. In other words, network resources discovery proxy 116 either modifies or ignores the response packet based on the scope of the network resources discovery restrictions set forth in the local matching rules, the response packet being represented generally by reference numeral 137 in FIG. 2. For instance, if local matching rules restricts user device 113 from access to selected printers 125 of subnet 117-2, controller 127 engages in a filtering process for the response packet in order to prevent automated discovery of those unauthorized printers 125.

In the present example, printers 125-1 thru 125-3 may be located in a publicly-available, or unrestricted, work center. Accordingly, in this scenario, the response packet sent from subnet 117-2 would be forwarded, as is, to network-enabled device 113 and therefore allow for the automated discovery of all printers 125. By contrast, if local matching rules are established which restricts access to each printer 125 (e.g. when each printer 125 is located in a particular hotel room), NRDP 116 filters the response packet sent from subnet 117-2 to restrict identification of only those printers 125 to which the user device 113 has authorized access (e.g., to only the printer 125 that is located in the hotel suite of the user).

In this capacity, network resources discovery system 111 is designed to isolate the discovery and accessibility of network services and related devices to an authorized set of user devices (i.e., either some, none, or all user devices). For instance, in a hotel environment in which each room is equipped with multiple IoT devices, wherein each IoT device is supported by a designated subnet 117, system 111 thereby enables a hotel patron to effectively create a custom, user-specific, network where only those IoT devices present within the user hotel room are discoverable by the user device 113. As such, network resources discovery system 111 is rendered scalable but, at the same time, effectively secure.

The invention described in detail above is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A system for facilitating the automated discovery of network resources provided by a computer network using a network-enabled device, the system comprising:
    (a) a computer network configured to support one or more network resources; and
    (b) a network resources discovery proxy configured with a set of network resources matching rules which defines a selection of the one or more network resources that are authorized for access by the network-enabled device to be discoverable;
    (c) wherein the network resources discovery proxy intermediates all network resources discovery packets sent between the network-enabled device and the computer network, the network resources discovery proxy regulating the delivery and selectively filtering network resources discovery packets sent between the network-enabled device and the computer network based on the set of network resources matching rules, the network resources discovery proxy imposing restrictions on the automated discovery of the one or more network resources available to the network-enabled device based on the set of network resources matching rules.

2. The system as claimed in claim 1 wherein the set of network resources matching rules is modifiable.

3. The system as claimed in claim 2 wherein the computer network comprises a plurality of network devices.

4. The system as claimed in claim 3 wherein the network resources discovery proxy restricts automated discovery to a selection of the plurality of network devices based on the set of network resources matching rules.

5. The system as claimed in claim 4 wherein the network resources discovery proxy comprises a local controller in communication with the network-enabled device and the computer network.

6. The system as claimed in claim 5 wherein the computer network is a local area network with multiple, logically independent subnetworks.

7. A method for automatically discovering network resources provided by a computer network using a network-enabled device, the method comprising the steps of:
    (a) providing a network resources discovery proxy for intermediating all network resources discovery packets sent between the network-enabled device and the computer network;
    (b) storing a set of network resources matching rules in the network resources discovery proxy, the network resources matching rules defining a selection of the network resources that are authorized for access by the network-enabled device to be discoverable; and
    (c) sending of network resources discovery packets by the network resources discovery proxy between the network-enabled device and the computer network in compliance with the set of network resources matching rules, the network resources discovery proxy regulating the delivery and selectively filtering network resources discovery packets sent between the network-enabled device and the computer network based on the set of network resources matching rules, the network resources discovery proxy imposing restrictions on the automated discoverability of the network resources available to the network-enabled device based on the set of network resources matching rules.

8. The method as claimed in claim 7 wherein the set of network resources matching rules is modifiable.

9. The method as claimed in claim 8 further comprising the step of, after the sending step, automatically discovering a selection of the network resources provided by the computer network using the network-enabled device.

10. The method as claimed in claim 9 wherein the automatic discovery of the selection of network resources provided by the computer network is rendered in compliance with the network resources discovery packets intermediated by the network resources discovery proxy.

11. The method as claimed in claim 10 wherein the computer network comprises a plurality of network devices.

12. The method as claimed in claim 11 wherein the network resources discovery proxy restricts automated discovery to a selection of the plurality of network devices based on the set of network resources matching rules.

* * * * *